United States Patent [19]

Clark

[11] Patent Number: 5,199,536
[45] Date of Patent: Apr. 6, 1993

[54] HEATSHIELD INSTALLATION FOR AIRCRAFT BRAKE

[75] Inventor: Gary L. Clark, Maplewood, Ohio

[73] Assignee: The BFGoodrich Company, Akron, Ohio

[21] Appl. No.: 835,164

[22] Filed: Feb. 13, 1992

[51] Int. Cl.⁵ ............................................. F16D 65/84
[52] U.S. Cl. .................................. 188/264 G; 301/6.2
[58] Field of Search .............. 188/71.5, 71.6, 264 AA, 188/264 G; 301/6 A, 6 E, 6 CS, 6 WB

[56] References Cited

U.S. PATENT DOCUMENTS

| | | | |
|---|---|---|---|
| 3,887,041 | 6/1975 | Malone | 188/71.5 |
| 3,958,883 | 5/1976 | Stanton | 188/71.5 |
| 4,017,123 | 4/1976 | Horner et al. | 301/6 A |
| 4,585,096 | 4/1986 | Bok | 188/71.5 |
| 4,703,837 | 11/1987 | Guichard | 188/71.5 |
| 4,856,619 | 8/1989 | Peterson | 188/71.6 |
| 5,024,297 | 6/1991 | Russell | 188/264 G |
| 5,107,968 | 4/1992 | Delpassand | 188/264 G |

Primary Examiner—Robert J. Oberleitner
Assistant Examiner—Kevin D. Rutherford
Attorney, Agent, or Firm—Joseph Januszkiewicz

[57] ABSTRACT

A heat shield installation on a tire supporting wheel and brake assembly having a rim member with an inner surface that surrounds a heat sink composed of stator and rotor brake discs. A plurality of circumferentially spaced drive keys are located between the heat sink and the inner surface of the rim member with such keys slidably mounting the rotor discs. A heat shield is located between the inner surface and the drive keys with a plurality of circumferentially spaced spacers secured thereto. Fastener members interconnect the drive keys to the rim members through the spacers while securely locking the heat shield radially and axially relative to the rim member of the tire supporting wheel.

13 Claims, 3 Drawing Sheets

HEATSHIELD INSTALLATION FOR AIRCRAFT BRAKE

BACKGROUND OF THE INVENTION

This invention relates to a multi-disc aircraft brake system and more particularly to a new and improved heat shield installation for an aircraft multi-disc friction braking system.

During the braking of an aircraft, the alternately splined stator and rotor discs of the multi-disc brakes are brought into sliding contact with each other, generating considerable heat energy that must be dissipated to eliminate the highly deteriorative effects on the wheel and tire structure which, in certain instances such as abortive or rejected take-off, can result in sufficiently high heat to result in tire ruptures or fires.

As the heat, heat energy or brake energy is generated within the braking elements of the stators and rotors (hereinafter also referred to as the heat sink), such heat energy is dissipated via conduction, radiation and convection to the adjacent braking components, such as the wheel assembly, bearings, pistons and other adjacent structures. It is important to limit the heat transfer to protect the structures as much as possible. One manner of protecting these areas is to provide a heat shield between the heat generating elements of the (stator and rotors) heat sink and the wheel assembly, and its adjacent components and bearings.

The heat shield is attached to the wheel usually by numerous bolts and thus tend to conduct heat from the shield into the wheel at the numerous bolted points of mounting. It is object of the present invention to provide means for securing the wheel heat shield to the wheel in such a way that the conduction of thermal energy into the wheel and its adjacent structures is minimized by eliminating entirely the heat shield bolted connection to the wheel. With the use of specially designed spacers in cooperative action with the torque bars the heat shield is held more securely in place both axially as well as tangentially. The torque bars also provide multiple points of contact around the circumference of the full circle heat shield to provide rigidity in the radial direction without affecting the accuracy of location of the torque bar thus providing a more efficient heat shield system.

SUMMARY OF THE INVENTION

The present invention is directed to a tire supporting wheel and brake assembly wherein the wheel has a rim member with an inner surface that surrounds a heat sink composed of a plurality of stator and rotor brake discs. The stators are slidably connected to a torque tube that is connected to the stationary portion of the wheel supporting structures while the rotors are slidably mounted to circumferentially spaced keys that are connected to the rotatable wheel. A heat shield is located in the clearance space between the inner surface of rim member and the circumferentially spaced keys and are interconnected by a plurality of circumferentially spaced spacers which fixedly secure the heat shield in a radial position as well as an axial position relative to the central axis of the tire supporting wheel.

DETAILED DESCRIPTION

Figure 1:
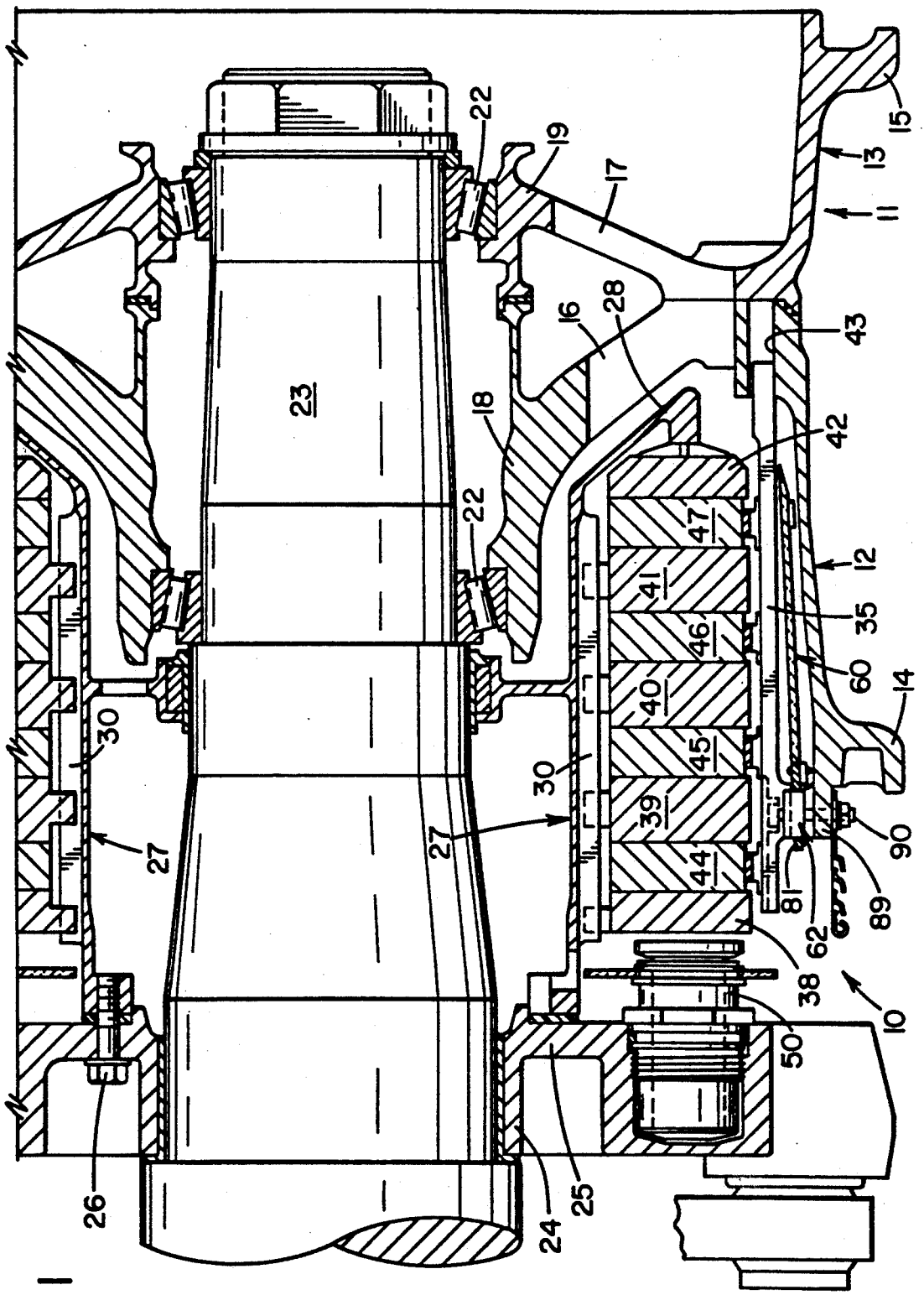
FIG. 1 is a fragmentary cross-sectional view of a brake of a brake assembly with a heat shield installation therein.

Referring to the drawings, wherein like reference numerals designate like or corresponding parts throughout the several views, there is shown in FIG. 1 a friction brake mechanism 10 for use with a cylindrical wheel 11, having matching wheel sections 12 and 13. Each of the wheel sections 12 and 13 has a rim member 14 and 15, web member 16 and 17, and hub members 18 and 19. The wheel sections 12 and 13 are fastened together by suitable bolts disposed in aligned bores within web members 16 and 17 to form an integral unit therewith.

The hub members 18 and 19 are supported for rotation on bearings 22 which are mounted on a nonrotatable axle member 23. A stationary carrier or boss 24 with a circumferentially extending flange 25 is suitably mounted on stationary axle 23. Flange 25 has a plurality of circumferentially spaced bores to receive bolts 26 for securing such flange to one end of a cylindrical torque tube member or torque tube 27. The other end of torque tube member 27 has an annular and radially outwardly-extending reaction plate or reaction member 28. The reaction plate member 28 may be made integral with the torque tube member 27 or may be made as a separate annular piece and suitably connected to the torque tube or torque tube member 27.

Torque tube 27 has a plurality of circumferentially spaced splines, ribs, or spline members 30 which are axially extending. Wheel section 12 has a plurality of circumferentially spaced torque transmitting bars, torque bars or keys 35 connected thereto as at their inboard ends by spacer means to be described and at their outboard ends to the upper portion of web section 16 by seating in an annular recess 43 in such web section. The torque-transmitting bars or keys 35 may be secured to the web section 16 of wheel 11 by other suitable means to provide an integral connection therebetween.

Ribs or spline members 30 support an axially non-rotatable end disc or stator disc 38 and inner discs 39, 40 and 41. All of such nonrotatable discs 38, 39, 40 and 41 have slotted openings at circumferentially spaced locations on the inner periphery for captive engagement by the spline members 30, as is old and well-known in the art. An annular disc or annular braking element 42 is suitably connected to the reaction plate 28 and acts in concert with the stator discs 38, 39, 40 and 41 which discs (38, 39, 40, 41 and 42) constitute the stators for the friction brake 10.

A plurality of axially spaced discs (rotor discs) 44, 45, 46 and 47 interspaced or interleaved between the stator discs 38 through 42, have a plurality of circumferentially spaced openings along their outer periphery for engagement by the corresponding wheel keys 35, as is old and well known in the art, thereby forming the rotor discs for the friction brake 10. All of the non-rotatable discs (38, 39, 40, 41 and 42) and rotatable discs (44 through 47) may be made from a suitable brake material such as metal, steel or other wear-resistant material such as carbon for withstanding high temperatures and providing a heat sink. The number of discs may be varied, as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots, as is old and well-known in the art.

The actuating mechanism for the brake includes a plurality of circumferentially spaced cylinders 50 suitable mounted on or connected to the flange 25. Within each of the cylinders 50 is a hydraulic piston, which is operative to move the stator disc 38 axially into and out of engagement with the rotatable disc 44, which in turn operates to have all of the brake disc to frictionally engage their radial surfaces and are resisted by the end stationary annular disc 42 and the reaction plate 28 on torque tube 27. During this period of brake disc engagement, the friction forces among all the rotatable and non-rotatable discs generate considerable heat energy within the discs and the adjacent structures. It is the frictional engagement of these stator and rotor discs which produces the braking action for the aircraft wheel.

Figure 3:
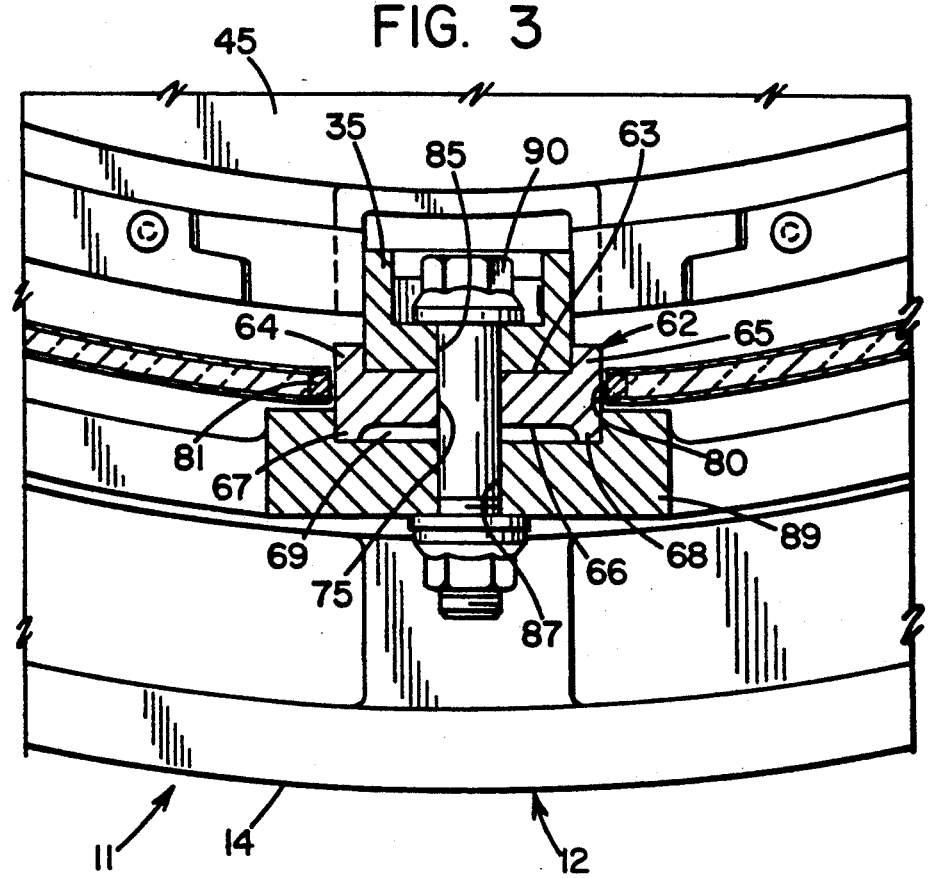
FIG. 3 is a front elevational view of a portion of the heat shield and its mounting taken on line 3—3 of FIG. 2.
Figure 4:
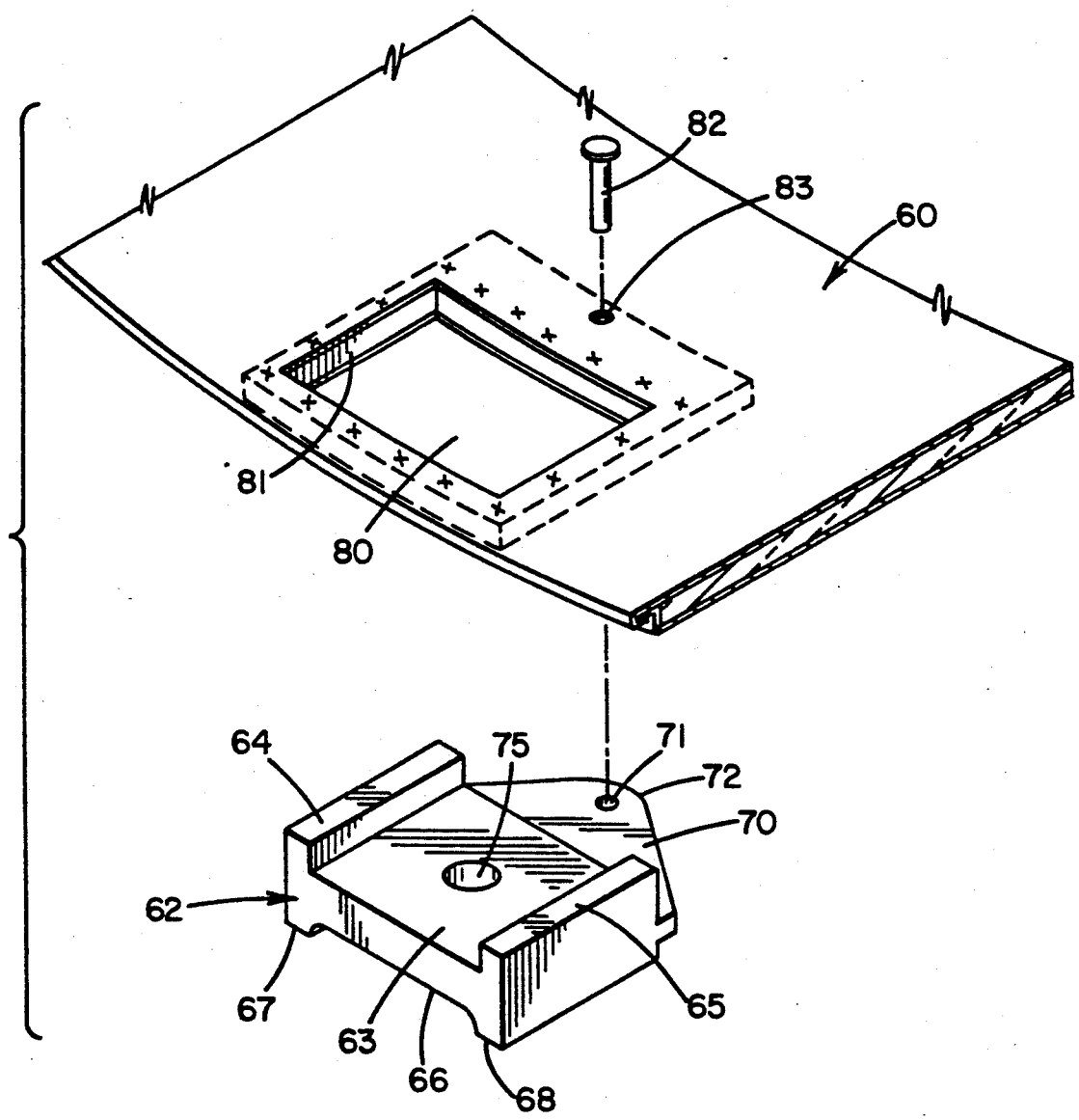
FIG. 4 is an exploded perspective view of the spacer and a portion of the heat shield with a reinforced aperture therein.

A cylindrical heat shield 60 is located between the inner surface of wheel section 12 and the torque-transmitting bars or keys 35. As described above, each key 35 at its outboard end is connected to the web section 16 by seating in an annular recess 43. The inboard end of each key 35 and the adjacent portion of the heat shield 60 is secured to rim member 14 of web member 12 by a spacer 62 (FIG. 4). Spacer 62 is a rectangular shaped member being recessed on its upper and lower surfaces to present an upper flat surface 63 with a pair of spaced abutments or shoulders 64 and 65 and present a lower surface 66 with a lower pair of abutments or shoulders 67 and 68. The spaced shoulders 64 and 65 as seen in FIG. 3 provide a seat to captively secure the keys 35 and operate to transfer torque from the keys 35 to the rim member 14 (via a flanged portion 89 on the rim member 14). The lower shoulders 67 and 68 of spacer 62 as viewed in FIG. 3 create an air gap or air space 69 with respect to flange 89 of rim 14 which reduces the surface area for the transfer of heat energy by conduction. The reference to upper and lower as designated above with respect to upper flat surface 63 and lower surface 64 is with respect to FIG. 3 and it must be remembered that the rim is a circumferentially extending surface and that there are a plurality of circumferentially spaced keys relative to central axis of rotation of the rim member 14. Extending in an outboard direction or rearwardly as viewed in FIG. 4 from the rectangular shaped member of spacer 62 is a flanged portion 70 of substantially less thickness than the main body portion of spacer 62. In plan view, the flanged portion 70 is triangular in shape with a bore 71 therein adjacent to the apex 72. Spacer 62 has a bore 75 in the center portion thereof extending from the upper surface 63 to the lower surface 66.

The heat shield 60 has a plurality of circumferentially spaced square shaped apertures 80 along its inboard end. The entire periphery of the apertures 80 of the heat shield 60 is made from reinforced material and is designated 81 in FIGS. 2, 3, and 4.

Figure 2:
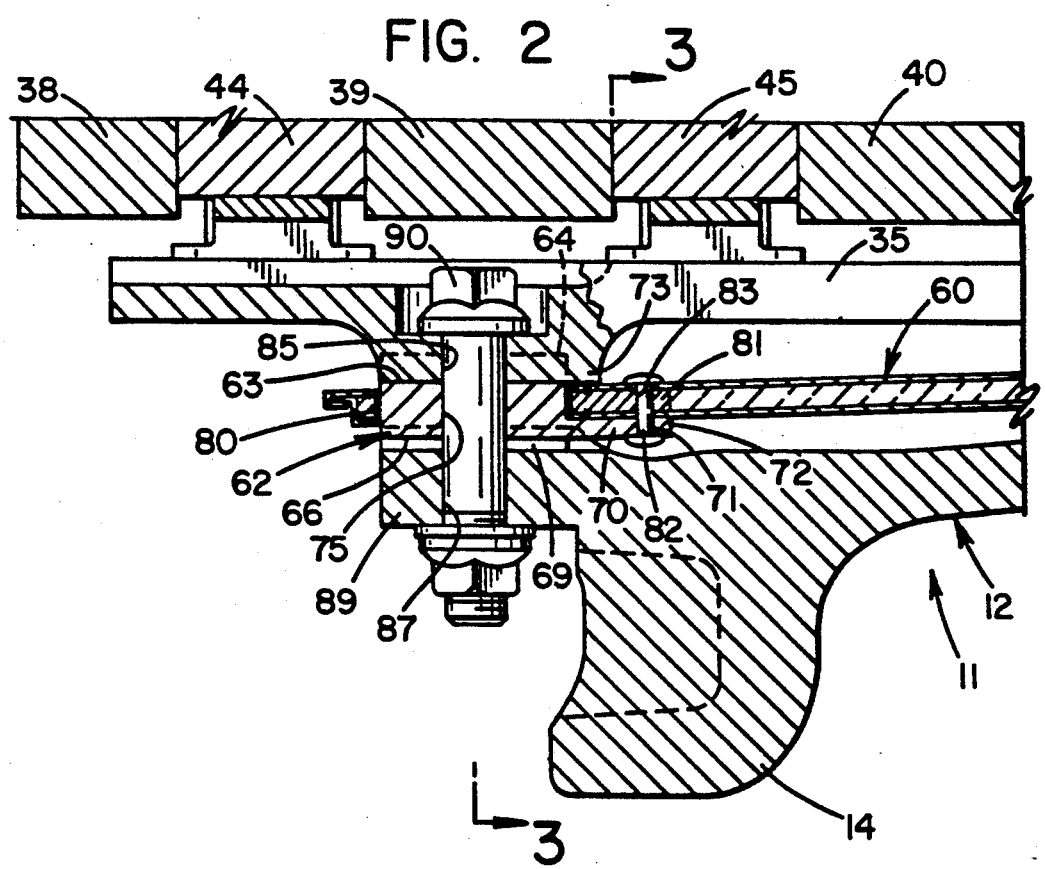
FIG. 2 is a side elevational view partly in cross-section of a portion of a heat shield secured to a rim member and a drive key by a spacer.

The spacer 62 is secured to the heat shield 60 by having the rectangular shaped body portion of the spacer 62 enter the aperture 80 of the heat shield while the flanged portion 70 frictionally engages the heat shield and is attached thereto by a fastener 82 that extends through bore 71 and a bore 83 in heat shield 60 adjacent to aperture 80. The inboard end of torque bar 35 has an aperture 85 in alignment with bore 75 in spacer 62, and a bore 87 in the flanged portion 89 of rim member 14 such that a bolt 90 interconnects these members to firmly secure the heat shield 60 to the rim member of the wheel 11 and trap the heat shield As seen in FIG. 2, key 35 has a shoulder 73 which abuts a radial inner surface of the heat shield With a plurality of these circumferentially spaced shoulders 73 on keys 35, the heat shield 60 is trapped from a movement in a radial direction. This interconnection eliminates the numerous bolts that are ordinarily used to secure the heat shield to the wheel which thus eliminates the conduction heat energy path. The above described spacer bar 62 secures the shield in a fixed position both axially and in a tangential direction while the keys or torque bars 35 with its shoulders 73 locate the shield in a radial direction and provides multiple points of support around the full circumference of the shield. With the described fastening of the heat shield to the spacer 62 as by fastener (as by riveting), the heat shield 60 is easy to handle and facilitates the assembly of the brake and wheel assembly.

It will be apparent that although a specific embodiment of the invention has been described in detail, the invention is not limited to the specifically illustrated and described construction since variations may be made without departing from the principles of the invention.

Having thus described my invention, what I claim as new therein is:

1. In an aircraft wheel and brake assembly having an axle with a circular flange thereon, said axle having a central axis, bearing means mounted on said axle; a wheel support mounted on said bearing means for rotation relative to said axle about said central axis, said wheel support having a circumferentially extending rim member and a radially inwardly disposed web portion; a torque tube with an annular hub secured to said circular flange; said torque tube having a plurality of circumferentially spaced splines; a plurality of stator discs mounted on said splines for axial movement thereon; a plurality of circumferentially spaced wheel keys located radially inwardly of said rim member and providing a clearance space therebetween, a plurality of rotor discs splined to said wheel keys for rotation therewith and for axial movement thereon; said rotor discs interleaved with said stator discs to define a heat sink; power means mounted on said circular flange for moving said stator discs and said rotor discs toward each other to effect a braking action; a heat shield located in said clearance space between said rim member of said wheel support and said wheel keys for circumferentially encompassing said heat sink, a plurality of circumferentially spaced spacers secured to said heat shield, and fastener means extending through said spacers and interconnecting the one end of said keys to said rim member while said spacers captively secure said heat shield in a radial and axial location relative to said central axis to control the flow of heat energy from said heat sink towards said wheel support.

2. In an aircraft wheel and brake assembly as set forth in claim 1 wherein each of said spacers has shoulders on its radial innermost portion for captively engaging said keys for transferring torque between said keys and rim member.

3. In an aircraft wheel and brake assembly as set forth in claim 2 wherein each of said keys have an abutment means on its radially outer periphery adjacent to said spacer to captively secure said heat shield in a predetermined location to prevent movement in a radial direction.

4. In an aircraft wheel and brake assembly as set forth in claim 2 wherein each of said spacers have shoulders on its radial outermost portion for engagement by recess means in said rim member to interlock said spacers in fixed circumferential positions around said central axis.

5. In an aircraft wheel and brake assembly as set forth in claim 4 wherein said shoulders on said radial outermost portion of each spacer cooperates with said recess means in said rim member to create air gaps to reduce the transfer of heat energy.

6. In an aircraft wheel and brake assembly as set forth in claim 4 wherein each of said spacers has an axially extending flange portion, and fastener means interconnecting said flange portions with an adjacent abutting portion of said heat shield to secure said spacers to said heat shield to provide a unitary maneuverable structure.

7. In an aircraft wheel and brake assembly as set forth in claim 6 wherein said heat shield has a plurality of circumferentially spaced apertures therein for receiving said circumferentially spaced spacers to locate said heat shield in a tangential direction.

8. In an aircraft wheel and brake assembly as set forth in claim 7 wherein each of said apertures in said heat shield is reinforced around its entire periphery to minimize the weight of said heat shield.

9. A wheel comprising a tire supporting wheel with a central axis and a circumferentially extending rim member, said rim member having an inner surface that surrounds a heat sink composed of a plurality of stator and rotor disc members, a plurality of circumferentially spaced drive keys located between said heat sink and said inner surface of said rim member to define a clearance space, a cylindrically shaped heat shield located in said clearance space between said inner surface of said rim member and said circumferentially spaced keys, said heat shield having a plurality of circumferentially spaced apertures with each aperture having an inner edge, a spacer member located in each of said apertures engaging said inner edge of said aperture, each of said spacers is secured to said heat shield, each of said spacers having one portion abutting a shoulder on one of said keys and another portion abutting a portion of said rim member, and fastener means interconnecting said keys to said rim member through said spacer members to fixedly secure said heat shield in a radial and axial location relative to said rim member of said tire supporting wheel.

10. A wheel as set forth in claim 9 wherein each spacer has a flange for abutting contact with said heat shield, and fastener means interconnecting said heat shield to each of said spacers at said flange that abuttingly contacts said heat shield to provide an integral structure with said heat shield to secure said spacers to said heat shield.

11. A wheel as set forth in claim 10 wherein each of said spacers has a groove on said one portion for captively receiving the inboard end of one of said keys for transferring torque from said keys to said rim member.

12. A wheel as set forth in claim 9 wherein each of said spacers has abutment means for captive engagement by circumferentially spaced recesses on said rim member to captively locate said spacers in circumferentially spaced locations around said rim member relative to said central axis.

13. A wheel as set forth in claim 12 wherein said abutment means on each of said spacers cooperate with said recess on said rim member receiving said abutment means to also define an air gap to limit the transfer of heat energy.

* * * * *